United States Patent [19]

Rousseau

[11] 3,947,600
[45] Mar. 30, 1976

[54] DIPEPTIDE SWEETENING OF COMESTIBLES
[75] Inventor: Patrick M. Rousseau, Lansing, Mich.
[73] Assignee: General Foods Corporation, White Plains, N.Y.
[22] Filed: Oct. 12, 1973
[21] Appl. No.: 405,985

[52] U.S. Cl. ................. 426/302; 426/96; 426/548; 426/621
[51] Int. Cl.$^2$ ...................... A23L 1/18; A23L 1/164
[58] Field of Search ............ 426/89, 93, 94, 95, 96, 426/98, 212, 217, 103, 208, 289, 72, 302, 303, 297, 548, 618, 619, 620, 621

[56] References Cited
UNITED STATES PATENTS

| | | | |
|---|---|---|---|
| 901,455 | 10/1908 | Lauhoff | 426/103 X |
| 3,642,491 | 2/1972 | Schlatter | 426/163 X |

*Primary Examiner*—Raymond N. Jones
*Assistant Examiner*—Esther L. Massung
*Attorney, Agent, or Firm*—Bruno P. Struzzi; Thomas V. Sullivan; Michael J. Quillinan

[57] ABSTRACT

A dry comestible is coated with a dipeptide sweetening compound applied in the form of an aqueous foam to the surface of the comestible.

8 Claims, No Drawings

DIPEPTIDE SWEETENING OF COMESTIBLES

This invention relates to processes for handling and applying dipeptide sweeteners to dry comestible products generally and ready-to-eat breakfast cereal products specifically.

BACKGROUND OF THE INVENTION

Heretofore, dipeptide sweeteners such as the methyl ester of L-aspartyl L-3 phenylalanine and similar lower alkyl esters of aspartylphenylalanine have been evaluated as a possible sweetening compound to be applied to food products such as ready-to-eat breakfast cereal. Theoretically, this sweetener could serve as a substitute for conventional sugars which are used as coatings on the food products like flaked or puffed ready-to-eat cereals. Reduction in the level of surface-applied sugar on such products is thought to improve the comestible from the standpoint of its lessened caries-inducing character.

Such dipeptides are quite sweet and, therefore, must be applied in a form wherein they are relatively dispersed to avoid localized organoleptic reactions which offset the contribution that might otherwise be provided from the sweetener being localized on the food product surface. On the other hand, in attempting to apply a relatively dilute solution to a ready-to-eat breakfast cereal product, the application of the compound is unsatisfactory since it has been found that the particles thereof tend to flake off the food product. Moreover, it had been thought by those skilled in the art that water as a diluent for such dipeptide sweeteners, hereinafter referred to as APM, was impractical due to the relative insolubility of the APM and the degradation thereof in aqueous medium. Other attempts to employ a more compatible diluent such as alcohol or fat are impractical for one reason or another. In the case of fat, the level thereof necessary to effectively disperse sweetener is too high.

STATEMENT OF THE INVENTION

This invention is founded on the discovery that water and APM can be converted into a stable, sprayable foam without degradation of the APM and that this foam can be applied onto the comestible product, i.e. a ready-to-eat breakfast cereal product. The thusly coated product does not undergo an undesirable loss of functionality as a sweetener during storage.

GENERAL DESCRIPTION OF THE INVENTION

In preparing the foamy composition of this invention, a relatively saturated aqueous solution of the APM is prepared which in any event is operative to fully wet the particles of APM. This mixture may then be converted by any one of a number of means known to those skilled in the art into a foam suspension having a light, uniform condition of high overrun as by passage through an homogenizer or otherwise; thus, instead of homogenization, the foam can be generated by mixing the APM and water in a pressurized vessel and causing the solution thereof to undergo such expansion as creates a light delicate reticular structure which can then be applied as such in the form of a spray by atomization means.

Advantageously, this foam effectively disperses the APM so that despite its sweetening intensity, it is organoleptically evenly distributed throughout the surface of the food product. By employing water as a diluent, it is no longer necessary to use costly other solvents such as fat as a carrier. Moreover, by using water, rancidity and shelf-life problems stemming from the use of carriers such as fat are minimized due to the unexpectedly inert nature of small quantities of water per se in the amounts necessary to create the foam and apply it as such to the food product.

Generally, the foam will be applied as a very minor weight percent of the food product and typically in the neighborhood of 0.01% to 5%, commonly less than 2% and preferably, in any event, less than 3%, the level of foam applied being dependent upon the intended sweetness and the amount of water that may be indeed tolerated by the food product, since an excessive amount of water can contribute towards instability. For most dry alimentary food products and dry comestibles, the overall composition should have a moisture content less than 10% as the result of the APM foam emulsion being applied; and applications to products such as ready-to-eat breakfast cereal products and the like will involve adding that amount of foam which does not cause an increase in moisture content above 7% and more preferably above 5%. The sweetening power of the APM and like dipeptides is 100–300 fold that of sucrose and so the level in the foam will be used at that level whereat the intended sweetness comparable to sucrose is organoleptically desired in the so-called presweetened form of food products; e.g. ready-to-eat breakfast cereal puffs and flakes.

Should too high a level of water be added to the comestible by the dipeptide foam, the coated product may be dried by heat or otherwise, care being exercised to avoid heating the APM above 160°F or that elevated temperature whereat degradation may ensue.

OPERATIVE EXAMPLE

A mixture of 80% water and 20% APM is prepared and mixed for a short period of time by gradually adding the APM to the water with spoon mixing thereby creating a solution of APM which is highly saturated. The APM level added should not be in that excess which limits its ability to be sprayed upon being homogenized and foamed. This mixture is then fed into a C. W. Logeman Hand Homogenizer, cf. U.S. Pat. No. 2,064,402, and is pumped to discharge a light uniform foam suspension. Four to seven grams of the foam in a glass container is weighed out depending upon the percentage of sweetener to be applied to a breakfast cereal product; in this example a charge of 400 grams of toasted corn flakes was coated with the stated quantity of foam.

The filled glass container is part of a common atomizing spray mechanism adapted to be used to dispense fine particles, the spray nozzle being equipped with a depending tubular stem which is located within the body of the foam and under the action of the atomizer causes the foam to be sucked through the stem into the atomizing nozzle from the container and be transmitted in the form of a fine particulate dispersion. The foam is sprayed in this form onto the cereal flakes as they are tumbled in a conventional revolving coating reel. The foam created had a sweetening power equivalent to 150 parts of a comparable weight of sucrose. After the application of the foam, it is not necessary to dry the aqueous application as it is in such a small amount.

The invention provides a broad novel method of applying APM uniformly to cereal or other food pieces, the foam being quite uniform, pumpable, sprayable and stable without settling out of APM particles. The foam thus provides an improved delivery system which unexpectedly does not result in degradation of the dipeptide despite its aqueous nature.

Having described the invention by reference to the preferred best mode of practicing it, the invention will not be interpreted in accordance with the set of accompanying claims.

What is claimed is:

1. Process for sweetening a dry alimentary comestible coated with a lower alkyl ester of L-aspartyl L-phenylalanine dipeptide sweetening compound which comprises forming a relatively saturated aqueous solution of the dipeptide and water, converting the solution into a foam, applying the foam as a surface coating onto the comestible.

2. The process of claim 1 wherein the foam is sprayed onto the comestible.

3. The process of claim 1 wherein the comestible is a dry ready-to-eat breakfast cereal.

4. The process of claim 3 wherein the cereal is in a flaked form.

5. The process of claim 3 wherein the cereal is in a puffed expanded form.

6. The process of claim 5 wherein the cereal is gun puffed.

7. The process of claim 5 wherein the cereal is oven puffed.

8. The process of claim 1 wherein the sweetener is APM.

* * * * *